B. DE MATTIA.
COLLAPSIBLE CORE.
APPLICATION FILED JUNE 8, 1920.
1,389,440.
Patented Aug. 30, 1921.
2 SHEETS—SHEET 1.
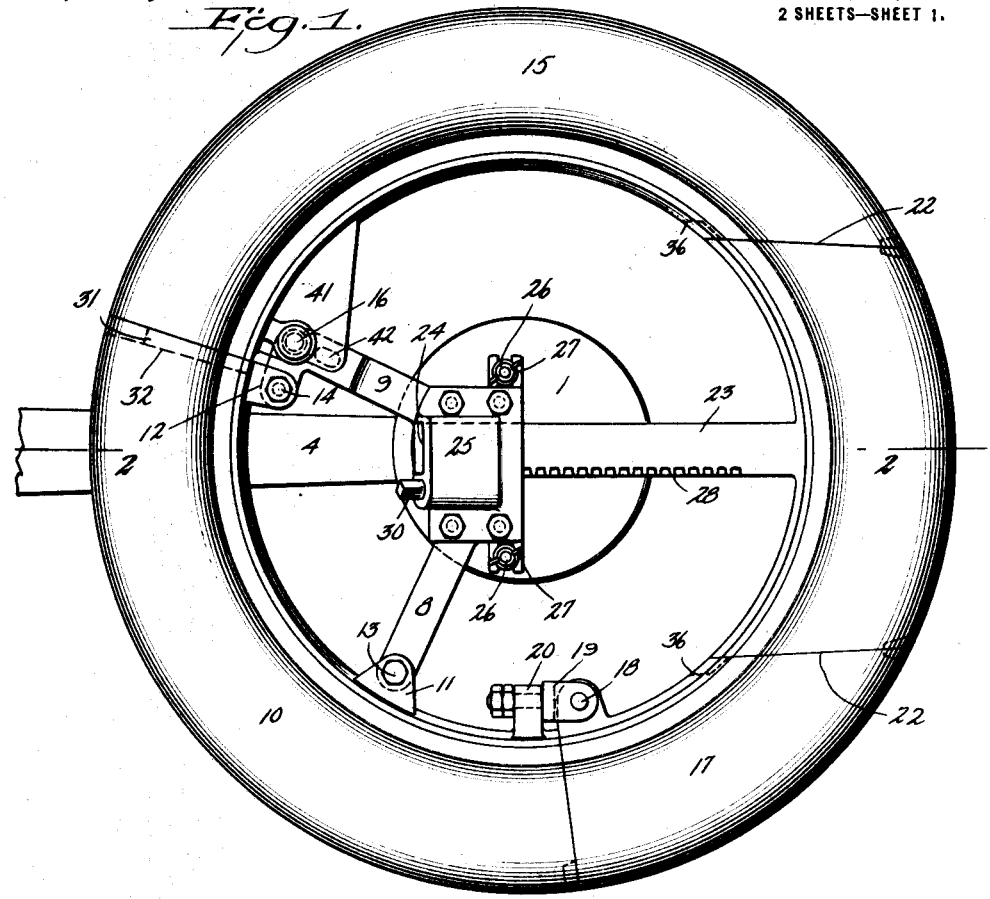
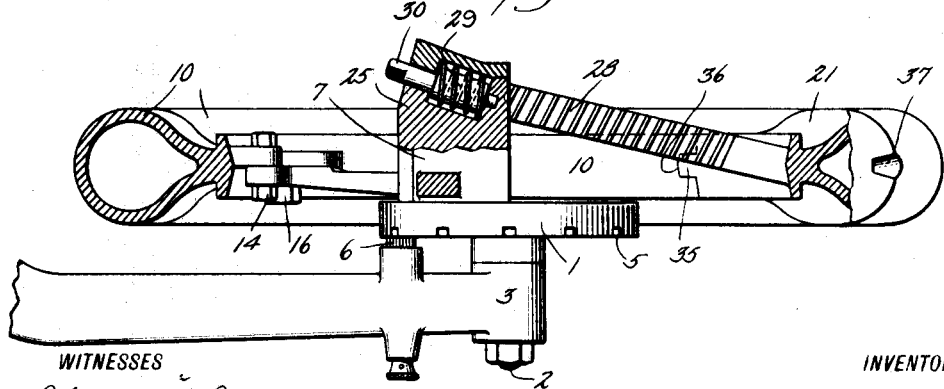
WITNESSES
INVENTOR
BARTHOLD DE MATTIA,
BY
ATTORNEYS

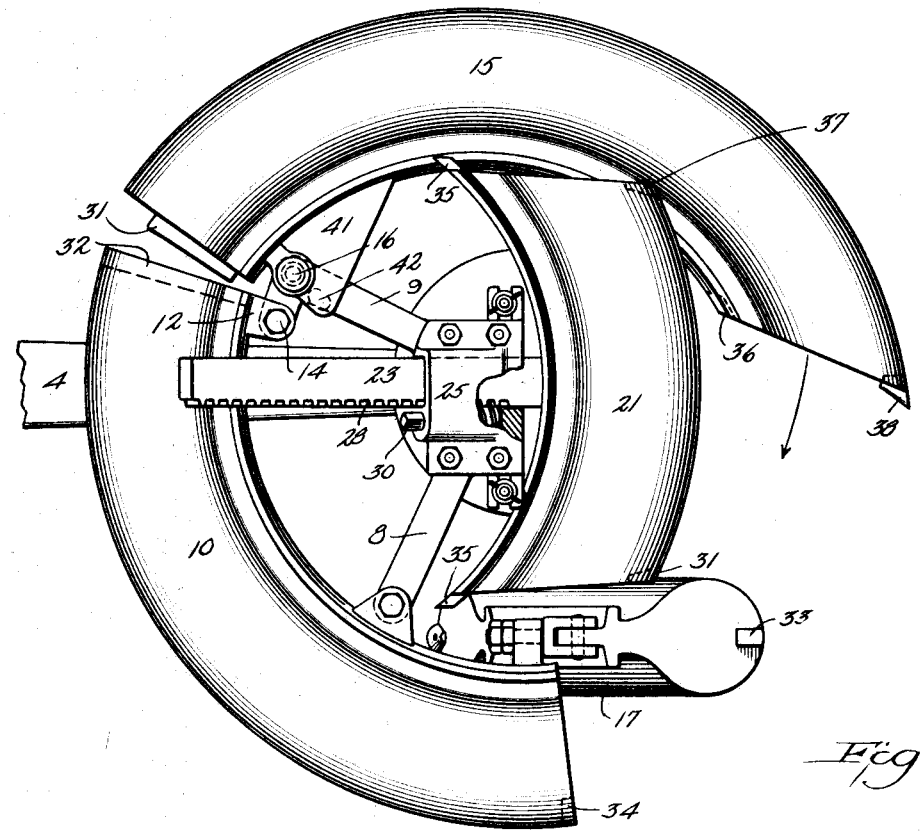
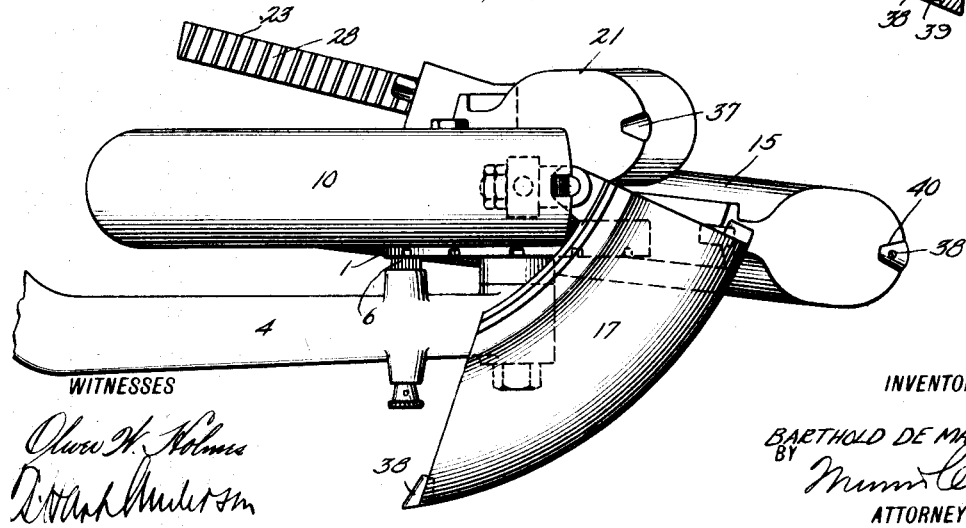

UNITED STATES PATENT OFFICE.

BARTHOLD DE MATTIA, OF CLIFTON, NEW JERSEY.

COLLAPSIBLE CORE.

1,389,440.  Specification of Letters Patent. Patented Aug. 30, 1921.

Application filed June 8, 1920. Serial No. 387,415.

*To all whom it may concern:*

Be it known that I, BARTHOLD DE MATTIA, a citizen of the United States of America, and resident of Clifton, county of Passaic, and State of New Jersey, have invented a new and useful Improvement in Collapsible Cores Used in the Manufacture of Shoes or Casings for Pneumatic Tires.

The present invention has for its object to provide a collapsible core the parts of which have such relative movement in the process of collapsing as to afford effective clearance for the movable parts, so as to secure the maximum of movement, and thus reduce the structure to the maximum extent permitted by the relative size and direction of movement of the movable parts with relation to a fixed part, thus providing for the ready removal of the tire or shoe built thereon, from the core.

To the above ends the present invention consists of a collapsible core comprising a plurality of segmental sections, including a key section, with means to move the key section radially and in an oblique direction with relation to the plane of the coöperating sections, into and out of the plane of the core.

The invention further consists of the devices and combinations of devices to be hereinafter described and claimed.

The invention is shown in the accompanying drawings in which—

Figure 1 shows a top plan view of a collapsible core embodying the invention with the core sections in operative continuity.

Fig. 2 shows a diametrical sectional view taken on the line 2—2 in Fig. 1.

Fig. 3 shows a plan view with the movable sections retracted and the core collapsed.

Fig. 4 shows a side view with the movable sections retracted and the core collapsed.

Fig. 5 is a detail illustrating one manner of providing a complementary locking connection between the meeting faces of the key section and the adjacent sections.

Similar reference characters will be employed throughout the specification and drawings to indicate corresponding parts.

In the drawings the collapsible core is shown as carried by a chuck comprising a revoluble table 1 having a stem 2 mounted to turn in a bearing 3 carried at the outer end of the arm 4, the arm 4 forming a part of a jack or support such as is usually employed to support cores of this character in a convenient position for the operator to build up the tire casing or shoe thereon.

The table 1 is provided upon its under surface with notches 5 arranged to receive and coöperate with a latch 6 mounted in the arm 4, whereby the table may be locked to hold the core from turning or unlocked to permit the core to be turned as required.

Upon its upper surface the table 5 carries a chuck 7 which is provided with radially extending rigid arms 8 and 9.

The arms 8 and 9 support the fixed segmental section 10 which is provided with lugs 11 and 12 which by means of the bolts 13 and 14 fixedly connect the segmental section 10 to the arms 8 and 9.

In addition to the fixed segmental section 10 the collapsible core comprises a segmental section 15 which is pivotally mounted at 16 to the arm 9, the pivotal connection being of such a character that the section 15 can swing inwardly as shown in Fig. 3 and also downwardly in an inclined direction as shown in Fig. 4, whereby its free end is caused to assume a position in a plane lower than the plane of the fixed section 10. This is clearly indicated in Fig. 4.

In other words the pivotal movement of the section 15 is about an inclined pivot so that the path of movement is not only inward and outward, but simultaneously upward and downward from the pivotal point toward the free end. This is for the purpose of causing the free end of the pivoted section 15 to clear the key section 21.

A relatively short segmental core section 17 is pivotally mounted at 18 to a swivel 19 mounted in a lug 20 so as to freely turn therein, and which is carried by the fixed segmental section 10, thus the segmental section 17 will not only have a pivotal movement about the pivot 18 in the plane of the fixed core section 10, but by reason of its swiveled connection it may be moved to the position shown in Figs. 3 and 4, whereby it assumes a position within the circumference of the core and below the plane thereof thus providing suitable clearance to facilitate the removal of the tire or shoe.

The core also comprises a segmental key section 21 of a length to fill the space between the free ends of the sections 15 and 17 when fitted therebetween, and this key section 21 and the sections 15 and 17 are provided with complementary meeting faces cut on lines 22 inclined with relation to each other and slightly converging from the inner toward the outer surface of the core, so that the key section 21 will have what might be termed a wedge-fit between the two pivoted sections.

The key section is carried by a shank or stem 23 which is obliquely disposed with relation thereto and with relation to the plane of the core, as shown clearly in Figs. 2 and 4, and the shank or stem 23 is arranged to slide in an inclined guideway 24 formed in a block or chuck 25 fixedly secured to the upper surface of the table 1, as by means of the bolts 26 and the wing nuts 27.

One edge of the shank or stem 23 is provided with rack teeth 28 engaged by a worm 29 mounted in a bearing in the block 25 and provided with a polygonal shank 30 arranged to be engaged by a suitable key or wrench and turned to impart sliding movements to the shank or stem 23 and the segmental key section carried thereby whereby the key section can be moved from a position of operative continuity as shown in Fig. 1 to the elevated position shown in Figs. 3 and 4, the inward movement causing the key section to assume a position in a plane elevated above the plane of the fixed section 10 and thus provide clearance for the movement of the pivoted sections 15 and 17.

It is intended that the upward movement or the oblique movement of the key section shall begin simultaneously with its inward movement and the meeting edges 22 will be suitably formed to attain this result.

Preferably the meeting ends of the fixed section 10 and the pivoted section 15 will be provided with complementary interlocking connections, as by means of a tenon 31 arranged to fit in a groove 32, and in like manner the section 17 will be provided with a tenon 33 arranged to engage a notch 34, and the key section will be provided with tenons 35 upon its inner edge arranged to engage notches 36 in the inner edges of the pivoted sections 15 and 17, and with sockets 37 in its outer edges arranged to be engaged by tenons 38 carried at the opposite ends and the outer edges of the key section.

These tenons 38 may be formed separately as shown in Fig. 5 and attached by screws 39 or in any other suitable manner, and for the purpose of forming an effective lock or stop, and to permit of the simultaneous inward and upward movement of the key section 21, the tenons 38 are tapered or inclined from their inner toward their outer ends, as shown clearly at 40 in Fig. 4 and of course the sockets 37 are correspondingly shaped as shown in Figs. 2 and 4.

As shown in Figs. 1 and 3 the pivoted section 15 is provided with a plate 41 by which it is pivoted to the arm 9, and this plate carries a bearing 42 movable in contact with the upper surface of the arm 9 to assist in supporting the weight of the section 15 during its movement and when in a position of operative continuity.

It will be understood by those skilled in the art that the tire or shoe is built up on the core when the parts are in operative continuity as shown in Fig. 1. After the building up of the tire or shoe is completed it must be removed from the core to be subjected to shaping and vulcanization, and as it is formed of green rubber and fabric it is necessary that it be removed from the core with the least amount of distortion, and it is also essential that as much freedom of movement as possible shall be secured to facilitate this operation.

After the tire has been built up the key section is first withdrawn therefrom and caused to assume the position shown in Figs. 3 and 4, after which the segmental section 17 is withdrawn from the core and moved to the position shown in Fig. 4.

This affords considerable clearance space for the movement of the segmental section 15 which is drawn to the position shown in Fig. 3 with its free end downwardly inclined from the pivotal point 16.

At this stage it is a simple matter to strip the tire from the fixed segmental section 10 of the core after which the parts are again adjusted to the position of operative continuity shown in Fig. 1.

Having described the construction and operation of my invention, I claim:

1. A collapsible core comprising a plurality of segmental sections, one of said sections being a key section, and means to impart to the key section a radial movement into and out of a position of operative continuity obliquely to the plane thereof.

2. A collapsible core comprising a plurality of segmental sections, including a key section, and means for moving the key section radially into and out of the plane of the core and obliquely to the plane of the core.

3. A collapsible core comprising a fixed section and a pivoted section, the pivoted section having a compound simultaneous movement about a single pivot in two directions into and out of operative continuity whereby its free end is depressed and elevated.

4. A collapsible core comprising a fixed section, two pivoted sections arranged at the opposite ends of the fixed section, a key section movable into and out of the plane of operative continuity, a support for such sections, all of the sections being permanently connected to said support and means whereby the said sections may be moved with relation to each other and whereby the pivoted sections and the key section have movements into and out of the plane of operative continuity in opposite directions from said plane, and obliquely thereto.

BARTHOLD DE MATTIA.